(12) United States Patent
Sasaki et al.

(10) Patent No.: US 6,508,399 B2
(45) Date of Patent: Jan. 21, 2003

(54) PROXIMITY TYPE CONTACTLESS IC CARD ISSUANCE MACHINE

(75) Inventors: Naotaka Sasaki, Kiryu (JP); Kenji Sugaya, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 09/871,962

(22) Filed: Jun. 4, 2001

(65) Prior Publication Data

US 2001/0048028 A1 Dec. 6, 2001

(30) Foreign Application Priority Data

Jun. 5, 2000 (JP) ........................................ 2000-167128

(51) Int. Cl.[7] ................................................. G06F 7/08
(52) U.S. Cl. ........................ 235/381; 235/379; 235/380; 235/492; 235/451
(58) Field of Search ................................ 235/379, 380, 235/381, 352, 492, 449, 475, 451

(56) References Cited

U.S. PATENT DOCUMENTS

| | | | | |
|---|---|---|---|---|
| 5,229,586 A | * | 7/1993 | Ishii | 235/375 |
| 6,095,424 A | * | 8/2000 | Prancz | 235/486 |
| 6,173,898 B1 | * | 1/2001 | Mande | 235/488 |
| 6,198,361 B1 | * | 3/2001 | Arisawa | 332/115 |
| 6,202,932 B1 | * | 3/2001 | Rapeli | 235/380 |
| 6,286,759 B1 | * | 9/2001 | Nakajima et al. | 235/449 |
| 6,299,069 B1 | * | 10/2001 | Shona | 235/382.5 |
| 6,309,098 B1 | * | 10/2001 | Wong | 194/205 |
| 6,345,760 B1 | * | 2/2002 | Eason et al. | 235/380 |

FOREIGN PATENT DOCUMENTS

JP 2001313515 A * 11/2001 ............ H01Q/7/00

* cited by examiner

*Primary Examiner*—Michael G. Lee
*Assistant Examiner*—Daniel Walsh
(74) *Attorney, Agent, or Firm*—Birch, Stewart, Kolasch & Birch, LLP

(57) ABSTRACT

The present invention provides a proximity type contactless IC card issuance machine comprising an IC card processing mechanism that reads or writes information from or into an IC chip buried in an IC card through a signal transmission element and a print processing mechanism that carries out printing on a surface of the IC card, wherein at least a card collision preventive member having edge portion for smoothly guiding transfer of the IC card is provided near to the signal transmission element. The card collision preventive member can be made to serve as a fixing spacer for the signal transmission element. An edge portion for smoothly guiding transfer of the IC card may be provided to the signal transmission element, in stead of the card collision preventive member provided near to the signal transmission element.

7 Claims, 4 Drawing Sheets

PROXIMITY TYPE CONTACTLESS IC CARD ISSUANCE MACHINE

BACKGROUND OF THE INVENTION

1. Field of the Invention

This invention concerns a proximity type contactless IC card issuance machine. More particularly, this invention concerns an improvement of a proximity type contactless IC card issuance machine that makes the efficient issuance of proximity type contactless IC cards possible.

2. Description of the Prior Art

Recently, ID cards of various types are being used. Such ID cards are requested to be prevented from tampering and to have increased memory capacities. In order to respond to such requests, IC cards are being used for ID cards. There are two types of IC cards, namely, contact IC cards and contactless IC cards. In the contact IC cards, readings or writings of information from or into IC chips buried in the cards are made through electrodes formed on the surfaces of the cards. In the contactless IC cards, readings or writings of information from or into IC chips buried in the cards are made by use of electromagnetic waves of radio frequencies. Some of the contactless IC cards are responsive to the electromagnetic waves generated from signal processing circuits placed 20 to 30 mm apart according to the sizes of the antenna elements and/or the output intensity of the signal processing circuits. On the other hand, some of the contactless IC cards, in which induction coils are provided in the IC chips in the IC cards to reduce the costs, are responsive to the electromagnetic waves generated from signal processing circuits placed 2 to 3 mm apart. These contactless IC cards are called proximity type contactless IC cards.

In general, a proximity type contactless IC card comprises an IC card of a credit card size in which an IC chip is buried. Proximity type contactless IC cards are also sometimes called proximity contactless cards. Encryption data for certifying the rightfulness and personal data of the IC card holder are stored in the IC card.

Proximity type contactless IC cards are issued by a proximity type contactless IC card issuance system comprising a proximity type contactless IC card issuance machine and a workstation. The proximity type contactless IC card issuance machine comprises a print processing mechanism and an IC card processing mechanism. The print processing mechanism is connected to the workstation through communication channels conformable to SCSI, IEEE 1284 or the like. The IC card processing mechanism is connected to the workstation through communication channels such as USB.

An IC card to be processed is put into an inlet of the proximity type contactless IC card issuance machine, transferred to the respective processing mechanisms of the machine where IC encoding or printing process is made into the IC card, and finally put out from an outlet of the machine. Various data are written by the IC encoding into the IC chip of the finished IC card, and personal data such as a photograph of face and an ID number are printed by the printing process on a surface of the IC card.

An antenna tip that is a signal transmission element and a control circuit are mounted on an IC encoder substrate inside of the proximity type contactless IC card issuance machine. The antenna tip comprises a ferrite material of a cylindrical form and an excitation coil wound on its circumference. The control circuit modulates or demodulates signals.

The IC card put into the inlet of the proximity type contactless IC card issuance machine is transferred to the place above the antenna tip so as to make the IC chip buried in the IC card oppose to the antenna tip. Then, information transformed into a predetermined form is exchanged between the IC chip and the control circuit through the antenna tip and the excitation coil so that the information may be read by or written into the IC chip or the control circuit.

A vertical size of a transfer passage of the IC card in the proximity type contactless IC card issuance machine is made larger than the thickness of the IC card so that the IC card may not be blocked while being transferred. Accordingly, the IC card is transferred more or less trembling vertically. On the other hand, the IC card needs to be placed closely and precisely enough to the antenna tip, since the IC card is responsive only to the electromagnetic waves from the antenna tip placed within 2 to 3 mm as mentioned above.

Since the IC card being transferred is trembling vertically, it sometimes occurs that an edge of the IC card collides with an edge of the antenna tip, the IC card is blocked, the work is interrupted and the efficiency of the issuance of the proximity type contactless IC cards is deteriorated.

SUMMARY OF THE INVENTION

It is an object of the present invention to provide a proximity type contactless IC card issuance machine capable of raising the efficiency of the issuance of the proximity type contactless IC cards by avoiding the collision of the edge of the IC card with that of the antenna tip, the blocking of the IC card and the interruption of the work.

According to a preferred embodiment of the present invention, there is provided a proximity type contactless IC card issuance machine comprising an IC card processing mechanism that reads or writes information from or into an IC chip buried in an IC card through a signal transmission element and a print processing mechanism that carries out printing on a surface of the IC card, wherein at least a card collision preventive member having edge portion for smoothly guiding transfer of the IC card is provided near to the signal transmission element.

Since the edge of the IC card to be transferred is smoothly guided along the edge portion of the card collision preventive member, the IC card is not blocked and the work is not interrupted.

According to another preferred embodiment of the present invention, the card collision preventive member also serves as a fixing spacer for the signal transmission element.

Since the card collision preventive member and the fixing spacer for the signal transmission element can be molded as one body, an accurate positioning of the card collision preventive member and the signal transmission element is possible, and the distance of the antenna tip to the IC chip buried in the IC card, through which the antenna tip is responsive to the IC chip, can be set precisely.

According to further another preferred embodiment of the present invention, there is provided a proximity type contactless IC card issuance machine comprising an IC card processing mechanism that reads or writes information from or into an IC chip buried in an IC card through a signal transmission element and a print processing mechanism that carries out printing on a surface of the IC card, wherein an edge portion for smoothly guiding transfer of the IC card is provided to the signal transmission element.

Since the edge portion of the IC card is smoothly guided along the edge portion provided to the signal transmission element, the IC card is not blocked, the work is not interrupted and the card can be certainly transferred without adding supplemental card collision preventive members, and the system can be constructed at a low price.

DETAILED DESCRIPTION OF THE INVENTION

Figure 1:
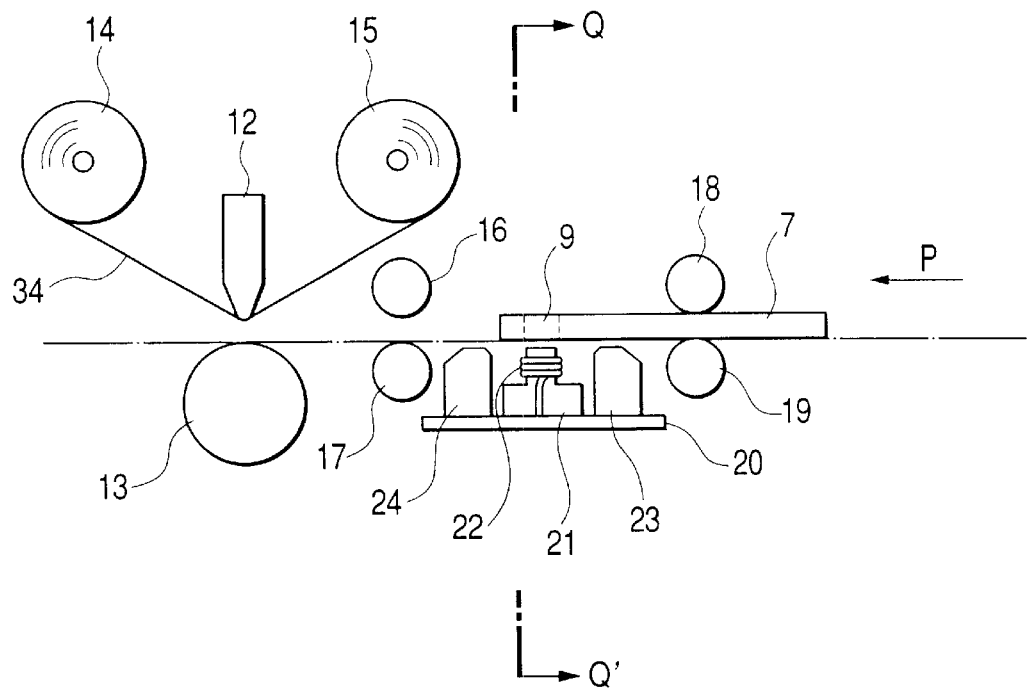
FIG. 1 is a front view illustrating the first embodiment of the proximity type contactless IC card issuance machine according to the present invention.

Embodiments of the proximity type contactless IC card issuance machine according to the present invention are explained referring to the drawings attached.

FIG. 1 is a front view illustrating the first embodiment of the proximity type contactless IC card issuance machine according to the present invention.

A print processing mechanism of the proximity type contactless IC card issuance machine shown in the drawing comprises a thermal head 12, a transfer ribbon 34 and a platen roller 13. Also, an IC card processing mechanism comprises a card transfer roller 19, a pinch roller 18, an IC encoder substrate 20, an antenna tip 21 that is a signal transmission element, an excitation coil 22 and card collision preventive members 23, 24.

In this IC card processing mechanism, an IC card 7 to be processed is transferred by the card transfer roller 19 and the pinch roller 18 along the direction indicated by an arrow P until an IC chip 9 buried in the IC card 7 is placed opposing to the antenna tip 21, and is stopped there. When the IC chip 9 is placed opposing to the antenna tip 21, information is exchanged between the IC chip 9 and a control circuit (not shown in the drawing) through the antenna tip 21 and the excitation coil 22.

Transfer of the IC card 7 from the IC card processing mechanism to the print processing mechanism, or from the print processing mechanism to the IC card processing mechanism, is made by the card transfer roller 17 and the pinch roller 16.

The print processing mechanism includes rollers 14 and 15. Further, the thermal head 12 having heating elements arranged in a line corresponding to the printing width is provided in the print processing mechanism. The IC card 7 is transferred to a place between the transfer ribbon 34 and the platen roller 13. Then, the IC card 7s is pressed to the platen roller 13 by the thermal head 12 so as to make an ink panel surface, formed on the transfer ribbon 34 and having an area including printable zone, closely contact with the IC card 7. Electric power is then repeatedly supplied to the line of the heating elements on the thermal head 12, while the platen roller 13 is being rotated. Ink in the transfer ribbon 34 is transferred to the IC card 7, and thus the printing is effected.

In the above description, explanation is made for a case where the recording system adopted in the print processing mechanism is a thermal transfer recording system. The present invention is also applicable to a print processing mechanism adopting an ink jet recording system or an electrophotography system in place of the thermal transfer recording system.

Figure 2:
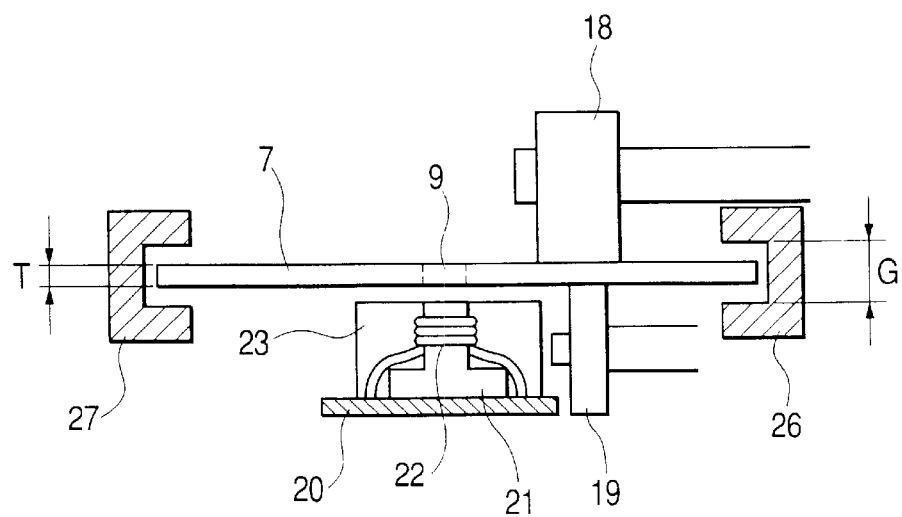
FIG. 2 is a cross-sectional view of an IC card processing mechanism taken along Q—Q' line in FIG. 1.

FIG. 2 is a cross-sectional view of an IC card processing mechanism taken along Q–Q' line in FIG. 1. In the drawing, 7 is the IC card, 26, 27 are card guides, 20 is the IC encoder substrate, 21 is the antenna tip, 22 is the excitation coil, and 23 is the card collision preventive member. The IC card 7 is transferred by the card transfer roller 19 and the pinch roller 18 with its longer sides supported by the card guides 26, 27.

Gaps G formed inside of the card guides 26, 27 are made larger than the thickness of the IC card 7 so that the IC card may not be blocked while being transferred, even though the IC card 7 is bent in some degree. Accordingly, the IC card is allowed for trembling vertically while being transferred guided in the gaps G.

On the other hand, the IC card 7 needs to be placed closely and precisely enough to the antenna tip 21, since the IC card 7 is responsive only to the electromagnetic waves from the antenna tip 21 placed within 2 to 3 mm. If the IC card 7 being transferred is trembling vertically, it sometimes occurs that an edge of the IC card collides with an edge of the antenna tip 21 and the IC card 7 is blocked. In order to avoid such collision of the IC card 7 with the antenna tip 21, card collision preventive members are provided in the present invention.

Figure 3:
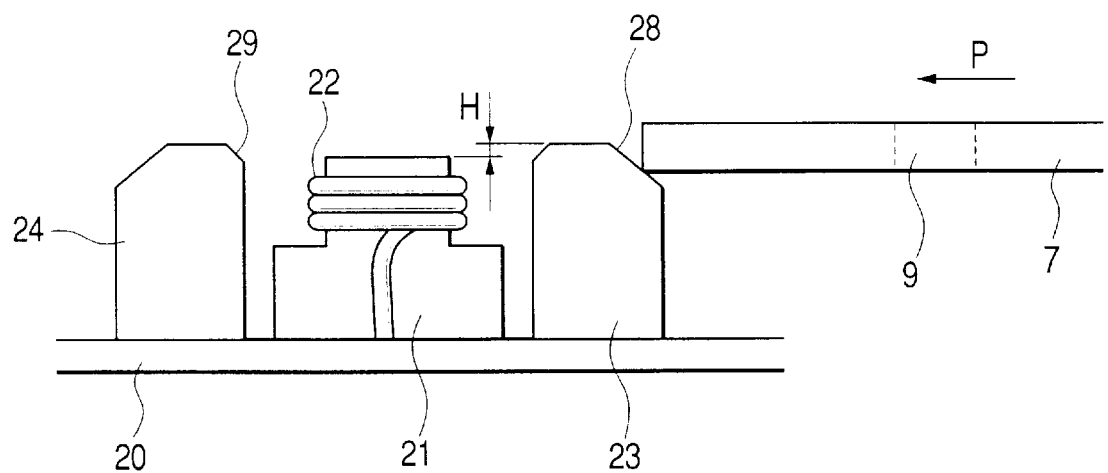
FIG. 3 is an enlarged front view of a card collision preventive member in the first embodiment of the proximity type contactless IC card issuance machine according to the present invention.

FIG. 3 is an enlarged front view of a card collision preventive member in the first embodiment of the proximity type contactless IC card issuance machine according to the present invention.

In the embodiment as shown in the drawing, a pair of card collision preventive members 23, 24 is arranged along the direction of the transfer of the IC card 7, and the card collision preventive members 23, 24 are placed near to the antenna tip 21 with the antenna tip 21 in between. Each of the card collision preventive members 23, 24 has an outer edge portion (a further side from the antenna tip 21) to which a chamfer 28 is formed. The chamfer 28 raises the IC card 7 in a low position when it contacts with the card collision preventive member 23. Thus, the chamfer 28 guides the IC card 7 to be transferred smoothly.

Additionally, upper surfaces of the card collision preventive members 23, 24 are made higher than the upper surface of the antenna tip 21 by a predetermined small distance H (0.2 mm for example).

Further, an inner chamfer 29 corresponding to the small distance H is also formed at each of the inner edge portions (nearer sides to the antenna tip 21) of the card collision preventive members 23, 24.

Figure 4:
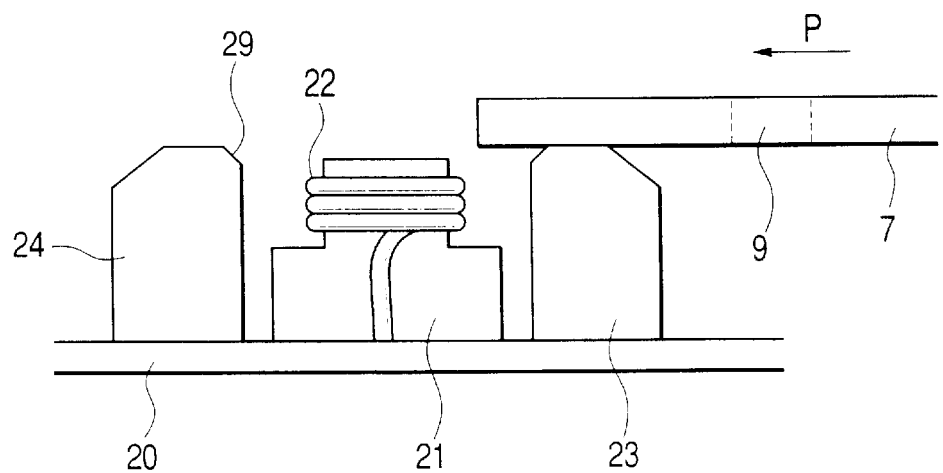
FIG. 4 is a front view of the card collision preventive members showing that an IC card is raised to a normal position and is transferred toward an antenna tip without colliding with the antenna tip.

FIG. 4 is a front view of the card collision preventive members 23, 24 showing that the IC card 7 is raised to a normal position and is transferred toward the antenna tip 21 without colliding with the antenna tip 21.

In the above explained example, a pair of the card collision preventive members 23, 24 is arranged along the direction of the transfer of the IC card 7, and the card collision preventive members 23, 24 are placed near to the antenna tip 21 with the antenna tip 21 in between. If dispositions and procedures of the print processing mechanism and the IC card processing mechanism are arranged so that the direction of the transfer of the IC card 7 can be limited to only one direction (direction P for example), the card collision preventive member 23 is placed only at the side of the antenna tip 21 where the IC card 7 approaches. If it is the case, the inner chamfer 29 at the inner edge portion of the card collision preventive member 23 is not necessary also.

Preferably, the chamfer 28 and the inner chamfer 29 are formed in curved surfaces.

In the first embodiment of the proximity type contactless IC card issuance machine according to the present invention as explained above, at least one of the card collision preventive members 23, 24 each having the edge portion to which chamfer 28 for guiding smoothly the edge of the IC card 7 is provided near to at least one side of the front and rear sides of the antenna tip 21 that is the signal transmission element, facing to the direction of the transfer of the IC card 7. Accordingly, the edge of the IC card 7 to be transferred is smoothly guided along the edge portion of each one of the card collision preventive members 23, 24, the IC card 7 is not blocked and the work is not interrupted.

Figure 5:
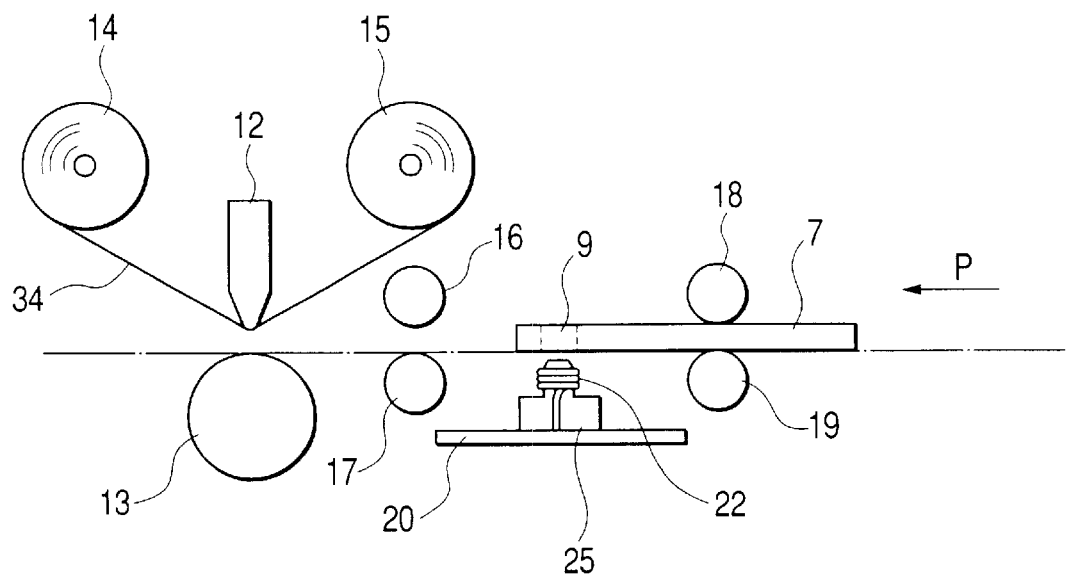
FIG. 5 is a front view illustrating the second embodiment of the proximity type contactless IC card issuance machine according to the present invention.

FIG. 5 is a front view illustrating the second embodiment of the proximity type contactless IC card issuance machine according to the present invention.

A print processing mechanism of the proximity type contactless IC card issuance machine shown in the drawing comprises, similarly to the first embodiment, a thermal head 12, a transfer ribbon 34 and a platen roller 13.

An IC card processing mechanism comprises a card transfer roller 19, a pinch roller 18, an IC encoder substrate 20, an antenna tip 25 that is a signal transmission element and an excitation coil 22.

In this IC card processing mechanism, an IC card 7 to be processed is transferred by the card transfer roller 19 and the pinch roller 18 along the direction indicated by an arrow P until an IC chip 9 buried in the IC card 7 is placed opposing to the antenna tip 25, and is stopped there. When the IC chip 9 is placed opposing to the antenna tip 25, information is exchanged between the IC chip 9 and a control circuit (not shown in the drawing) through the antenna tip 25 and the excitation coil 22.

Transfer of the IC card 7 from the IC card processing mechanism to the print processing mechanism, or from the print processing mechanism to the IC card processing mechanism, is made by the card transfer roller 17 and the pinch roller 16.

Figure 6:
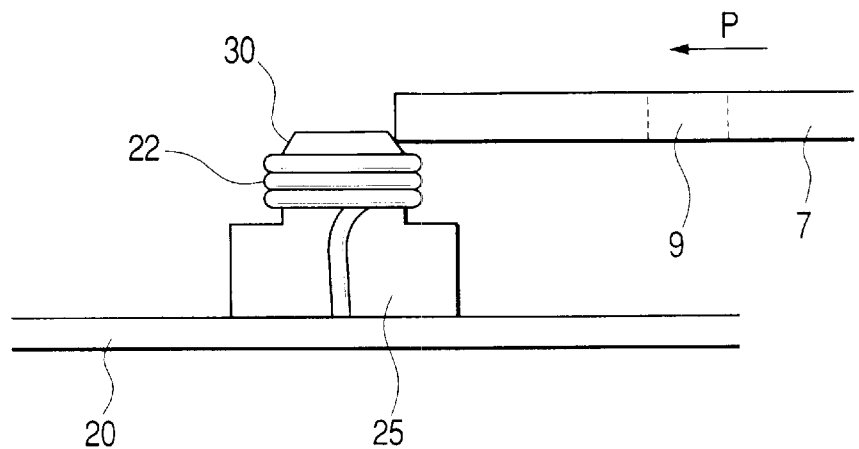
FIG. 6 is an enlarged front view of a card collision preventive member in the second embodiment of the proximity type contactless IC card issuance machine according to the present invention.

FIG. 6 is an enlarged front view of a card collision preventive member in the second embodiment of the proximity type contactless IC card issuance machine according to the present invention.

In the second embodiment as shown in the drawing, an edge portion having a chamfer 30 is provided to the antenna tip 25. The chamfer 30 raises the IC card 7 in a low position when it contacts with the antenna tip 25. Thus, the chamfer 30 guides the IC card 7 to be transferred smoothly. The size of the chamfer 30 is made to be equivalent to that of the chamfer 28 of the card collision preventive member 23 in FIG. 3. If the IC card 7 is transferred with its edge lowered, the edge will contact with the antenna tip 25. Then, being further pushed against the chamfer 30 in the direction of P, the IC card 7 is raised along the surface of the chamfer 30 and transferred to the encoding position without being blocked.

Preferably, the chamfer 30 is formed in a curved surface.

In the above explained second embodiment of the proximity type contactless IC card issuance machine, since the edge portion having the chamfer 30 for smoothly guiding the transfer of the IC card 7 to the antenna tip 25 that is the signal transmission element is provided, the IC card can be certainly transferred without adding supplemental card collision preventive members and the system can be constructed at a low price.

Figure 7:
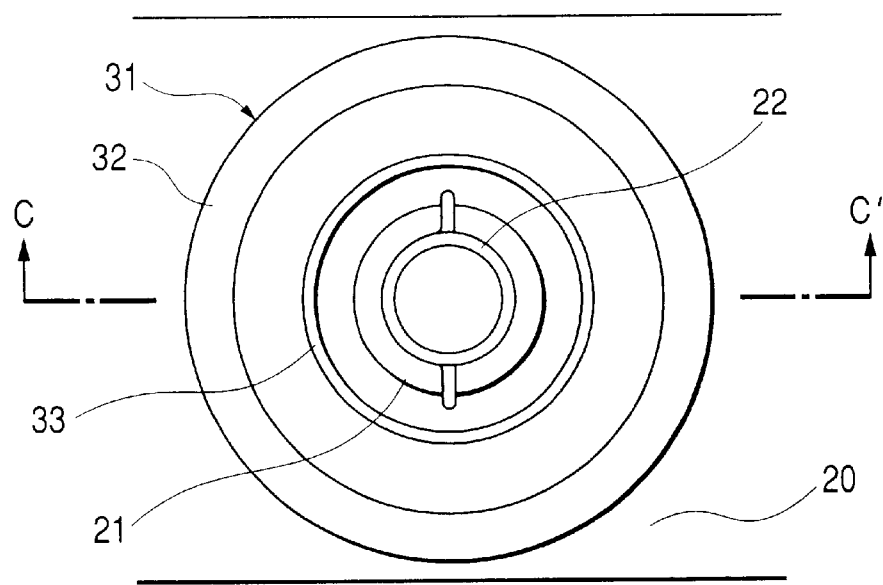
FIG. 7 is a top view illustrating the third embodiment of the proximity type contactless IC card issuance machine according to the present invention.

FIG. 7 is a top view illustrating the third embodiment of the proximity type contactless IC card issuance machine according to the present invention.

In the first embodiment of the proximity type contactless IC card issuance machine according to the present invention as shown in FIG. 3, the antenna tip 21, the card collision preventive member 23 and the card collision preventive member 24 are constructed separately as different members. In this embodiment, a card collision preventive member 31 is formed in a cylindrical form and the antenna tip 21 is mounted inside of the card collision preventive member 31. The card collision preventive member 31 also serves as a fixing spacer for the antenna tip 21 to the IC encoder substrate 20.

Figure 8:
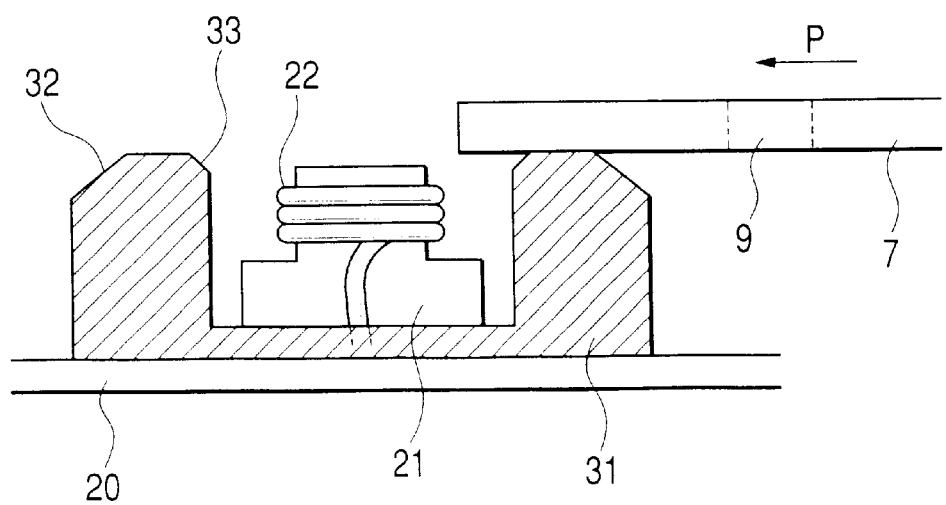
FIG. 8 is a cross-sectional view of an IC card processing mechanism taken along C–C' line in FIG. 7.

FIG. 8 is a cross-sectional view of an IC card processing mechanism taken along C–C' line in FIG. 7. In this example, the vertical distance between the upper surface of the antenna tip 21 and the upper surface of the card collision preventive member 31 that contacts with the lower surface of the IC card 7 can be made more precisely than in the first embodiment shown in FIG. 3 in which members are constructed separately as different members. As the result, the distance of the antenna tip 21 to the IC chip 9 buried in the IC card 7, through which the antenna tip 21 is responsive to the IC chip 9, can be set precisely.

The card collision preventive member 31 and the antenna tip 21 can be incorporated into one body by making them of an appropriate plastic resin, which is effective in view of cost reduction in manufacturing the system.

In the third embodiment of the proximity type contactless IC card issuance machine according to the present invention, the card collision preventive member 31 having the edge portion with the chamfer 32, 33 for smoothly guiding the transfer of the IC card 7 and serving also as the fixing spacer for the antenna tip 21 is placed around the antenna tip 21. Accordingly, the edge of the IC card 7 to be transferred is smoothly guided along the edge portion of the card collision preventive member 31, the IC card 7 is not blocked and the work is not interrupted. Further, since the card collision preventive member 31 and the fixing spacer for the signal transmission element can be molded as one body, an accurate positioning of the card collision preventive member 31 and the signal transmission element is possible, and the distance of the antenna tip 21 to the IC chip 9 buried in the IC card 7, through which the antenna tip 21 is responsive to the IC chip 9, can be set precisely.

In the above detailed explanation of the present invention, the proximity type contactless IC card issuance machine according to the present invention is explained in connection with the system in which the IC card processing mechanism is connected to the print processing mechanism. It is quite apparent that the proximity type contactless IC card issuance machine according to the present invention is also applicable to various modified systems and the same effects can be obtained. Such modified systems include a system in which an IC card processing mechanism is connected to a card flipping mechanism called flipper, and then connected to a print processing mechanism.

Further, it is also apparent that the same effects can also be obtained for a system in which the antenna tip 21 that is the signal transmission element, the excitation coil 22 and the card collision preventive members 23, 24 are mounted on a substrate of a small size separated from the IC encoder substrate 20.

What is claimed is:

1. A proximity contactless IC card issuance machine comprising:

an IC card processing mechanism that reads and writes information from or into an IC chip buried in an IC card through a signal transmission element; and a print processing mechanism that carries out printing on a surface of said card, wherein at least a card collision preventive member having a chamfered edge portion for smoothly guiding transfer of said IC card is provided near to said signal transmission element, the card collision preventive member preventing direct contact between said IC card and said signal transmission element.

2. The proximity contactless IC card issuance machine according to claim 1, wherein said card collision preventive member also serves as a fixing spacer for precisely setting the distance between said IC card and said signal transmission element.

3. A proximity contactless IC card issuance machine comprising:

an IC card processing mechanism that reads and writes information from or into an IC chip buried in an IC card through a signal transmission element; and a print processing mechanism that carries out printing on a surface of said card, wherein a chamfered edge portion for smoothly guiding transfer of said IC card is provided to said signal transmission element, and preventing direct contact between said IC card and said signal transmission element.

4. The proximity contactless IC card issuance machine according to claim 1, wherein the card collision preventive member and the signal transmission element are formed into one cylindrical body.

5. The proximity contactless IC card issuance machine according to claim 2, wherein the distance between said IC card and said signal transmission element is 2 to 3 mm.

6. The proximity contactless IC card issuance machine according to claim 3, wherein the said IC card processing mechanism causes said card to be positioned 2 to 3 mm from said signal transmission element.

7. The proximity contactless IC card issuance machine according to claim 3, wherein the edge portion of the card collision preventive member is formed in a curved surface.

* * * * *